United States Patent
Meijer et al.

(10) Patent No.: US 8,054,669 B2
(45) Date of Patent: Nov. 8, 2011

(54) NON-VOLATILE PROGRAMMABLE OPTICAL ELEMENT EMPLOYING F-CENTERS

(75) Inventors: Gerhard I. Meijer, Zurich (CH); Thilo H. Stöferle, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/189,983

(22) Filed: Aug. 12, 2008

(65) Prior Publication Data

US 2010/0039848 A1 Feb. 18, 2010

(51) Int. Cl.
*G11C 13/00* (2006.01)

(52) U.S. Cl. ........ 365/119; 365/114; 428/821; 428/822; 438/69

(58) Field of Classification Search .................. 365/114, 365/119; 428/821, 822, 822.1; 438/57, 69
See application file for complete search history.

(56) References Cited

U.S. PATENT DOCUMENTS

| | | | |
|---|---|---|---|
| 3,854,795 A | | 12/1974 | Honda |
| 4,960,324 A | * | 10/1990 | Brown ........................... 359/265 |
| 5,016,990 A | | 5/1991 | Dobson |
| 7,016,094 B2 | | 3/2006 | Awaya et al. |
| 7,580,596 B1 | * | 8/2009 | Meijer et al. ..................... 385/8 |
| 7,724,999 B2 | * | 5/2010 | Meijer et al. ................... 385/129 |
| 7,933,483 B2 | * | 4/2011 | Meijer et al. ................... 385/129 |

OTHER PUBLICATIONS

Blanc et al., "Electrodcoloration in SrTiO3: Vacancy Drift and Oxidation-Reduction of Transition Metals," Nov. 1971, Physical Review B, vol. 4, No. 10, pp. 3548-3557.*
Mohapatra et al., "Electrochromism in nickel-doped strontium titanate," Jul. 1979, Journal of Applied Physics, vol. 50, No. 7, pp. 5001-5006.*
Berney et al., "Photochromism of three photosensitive Fe centers in SrTiO3," Jan. 1981, Physical Review B, vol. 23, No. 1, pp. 37-50.*
Frederick C. Brown, "Color centers," in AccessScience, McGraw-Hill Companies, 2008, http://www.accessscience.com.*

* cited by examiner

*Primary Examiner* — Alexander Sofocleous
(74) *Attorney, Agent, or Firm* — Scully, Scott, Murphy & Presser, P.C.; Stephen C. Kaufman, Esq.

(57) ABSTRACT

A non-volatile programmable electro-optical element alters absorption characteristics of an optical medium that comprises a doped transition metal oxide material including F-centers. The F-centers are electrostatically moved into or out of the regions containing a wavefunction of an optical beam. A specific F-center profile in the transition metal oxide material may be programmed into the optical medium. The F-center profile alters an absorption profile within the optical medium. The spectral range for transmission of electromagnetic radiation in the optical medium may be tailored by the F-centers. Once the absorption profile is set by an electrical signal, the optical element maintains its state even when the electrical signal is turned off. Thus, the programming node may be disconnected from a power supply network, thereby enabling a low power operation of the electro-optical element. The inventive electro-optical element may be employed for both the visible and the infrared wavelength spectrum.

20 Claims, 9 Drawing Sheets

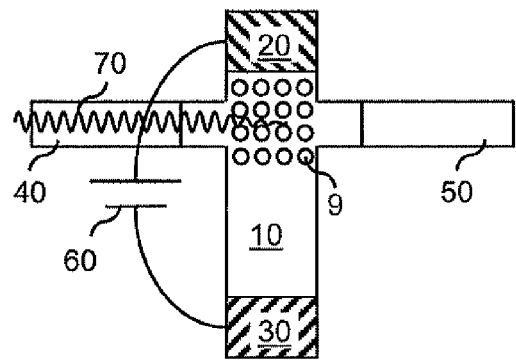 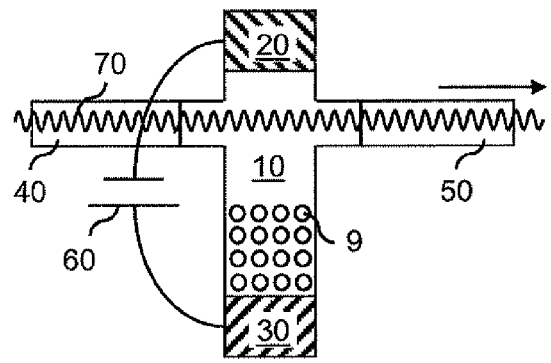
FIG. 2A FIG. 2B
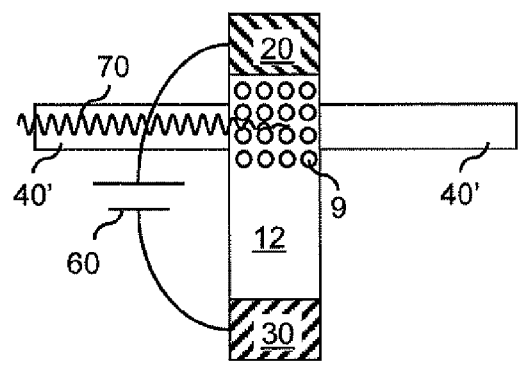 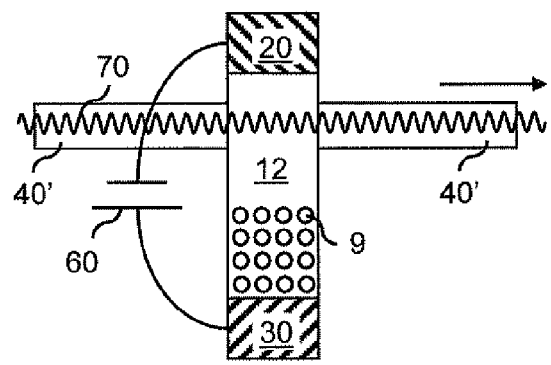
FIG. 3A FIG. 3B

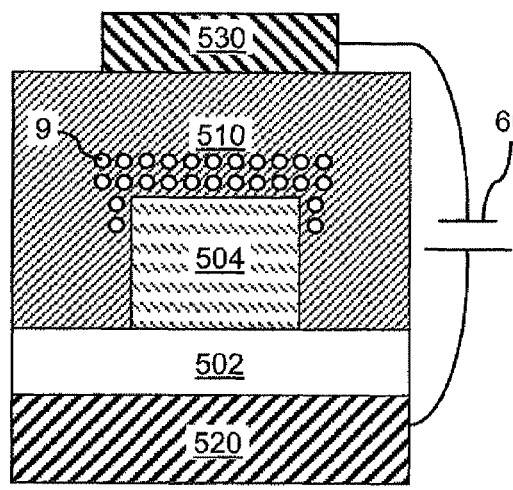
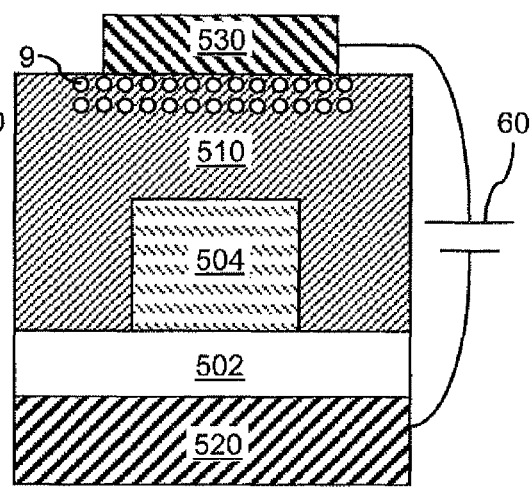
FIG. 10A  FIG. 10B
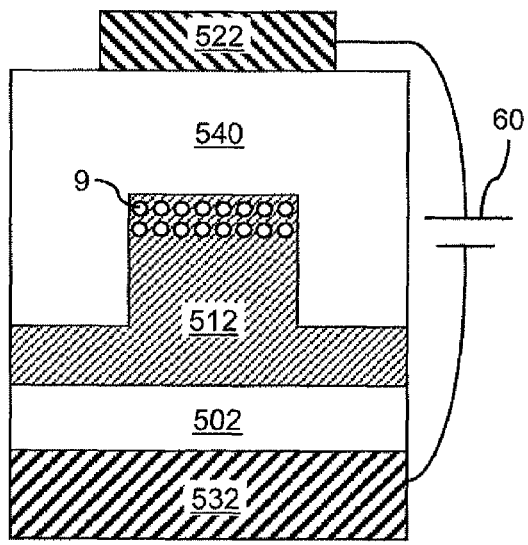
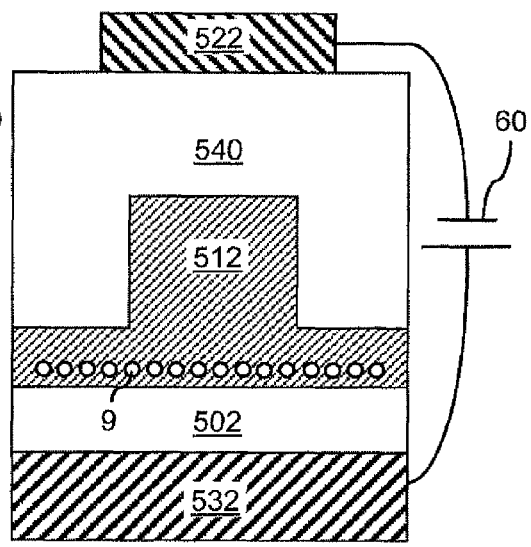
FIG. 11A  FIG. 11B

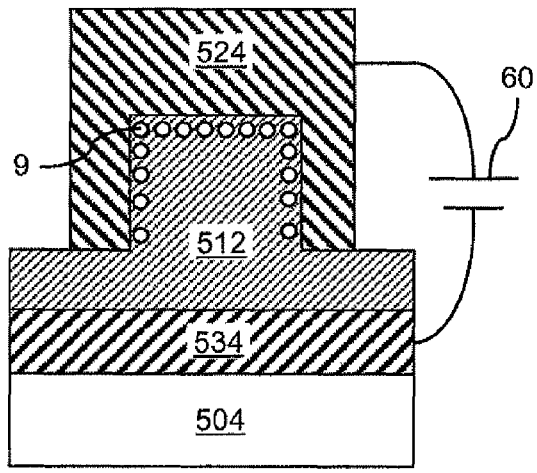
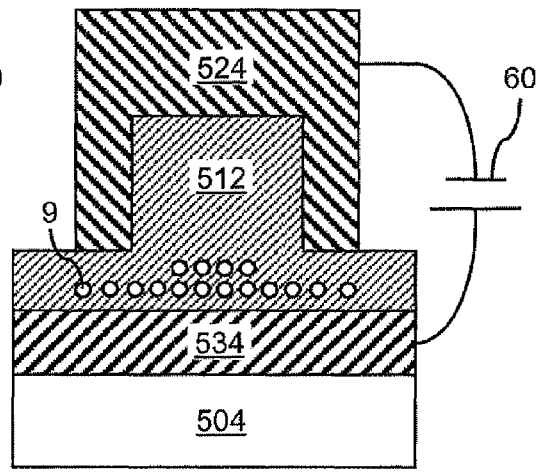
FIG. 12A  FIG. 12B
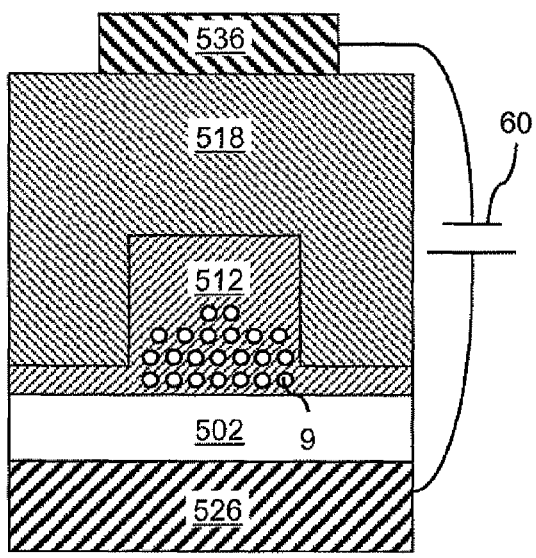
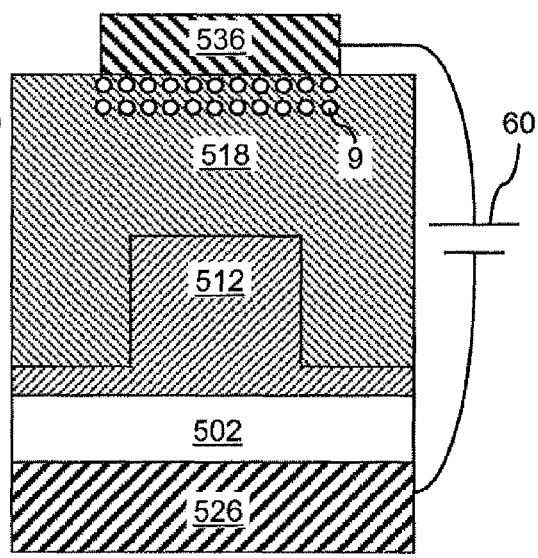
FIG. 13A  FIG. 13B

NON-VOLATILE PROGRAMMABLE OPTICAL ELEMENT EMPLOYING F-CENTERS

RELATED APPLICATIONS

The present application is related to co-assigned U.S. application Ser. No. 12/190,138, now U.S. Pat. No. 7,580,596, which is incorporated herein by reference.

FIELD OF THE INVENTION

The present invention relates to an optical structure, and particularly to a non-volatile programmable optical element that modulates the absorption coefficient of an optical material with F-center, methods of manufacturing the same, and methods of operating the same.

BACKGROUND OF THE INVENTION

Optical devices such as optical modulators or displays employ electro-optical elements that rely on modification of light absorption induced by an electrical signal. For example, U.S. Pat. Nos. 3,854,795, 5,016,990, and 7,016,094 provide electro-optical devices such as switches, filters, and tunable lasers, which are characterized by the modification of an absorption coefficient induced by an electrical-signal. Electrical-signal induced modification of absorption of electromagnetic waves in devices employing a semiconductor material may be obtained by injected charges, tuning of the band gap (Franz-Keldysh-effect), or the quantum-confined Stark effect in quantum wells. Electrical-signal induced modification of absorption of electromagnetic waves in devices employing ferromagnetic perovskite materials may be obtained by the magnetoresistive effect.

The main drawback of the above-mentioned electro-optical elements employing a semiconductor material is "volatility" of the change in the absorption characteristics of the semiconductor material. In other words, the change in the absorption characteristics of the semiconductor material is effective only as long as electrical power needs to be applied to the optical element. Such electro-optical elements are "volatile," i.e., they do not maintain the characteristics of a programmed state once power to the electro-optical element is turned off. A further disadvantage of the prior art optical elements employing a semiconductor material is that such electro-optical elements typically employ silicon or germanium, and are thus only suitable for the infrared wavelength range.

The main drawback of the above-mentioned electro-optical elements employing a ferromagnetic perovskite material is that these elements are only suitable for the far-infrared wavelength region. Specifically, such electro-optical elements are not suitable for the telecommunication wavelength range, which include 1,340 nm and 1,550 nm. Further, such electro-optical elements are not suitable for the visible wavelength region between 400 nm and 800 nm because the band gap of such materials is about 0.5 eV.

A further disadvantage of prior art electro-optical elements is that crystalline materials suffer from polarization dependency (birefringence), which requires additional structures to enable polarization-independent device operation. Moreover, crystalline materials, especially quantum wells, require high temperature processing, and therefore cannot be integrated back-end-of-line (BEOL) metal interconnect structures.

A non-volatile electro-optical element utilizing changes in refractive index of a metal oxide material is disclosed in co-assigned European Patent Application No. 08100566.2. This electro-optical element provides modulation of phase of the light by employing oxygen vacancies. Because the change in the refractive index is relatively small, this device tends to require a long optical path.

In view of the above, there exists a need for a compact electro-optical element that provides non-volatile modulation of absorption characteristics of an optical medium, methods of manufacturing the same, and methods of operating the same.

Further, there exists a need for such a compact electro-optical element that may be integrated into BEOL metal interconnect structures and does not have birefringence, methods of manufacturing the same, and methods of operating the same.

SUMMARY OF THE INVENTION

The present invention provides a non-volatile programmable optical element that modulates the absorption coefficient of an optical material with F-centers, methods of manufacturing the same, and methods of operating the same.

In the present invention, a non-volatile programmable electro-optical element alters absorption characteristics of an optical medium that comprises a doped transition metal oxide material including F-centers. The F-centers are electrostatically moved into or out of the regions containing a wavefunction of an optical beam. A specific F-center profile in the transition metal oxide material may be programmed into the optical medium. The F-center profile alters an absorption profile within the optical medium. The spectral range for transmission of electromagnetic radiation in the optical medium may be tailored by the F-centers. Once the absorption profile is set by an electrical signal, the optical element maintains its state even when the electrical signal is turned off. Thus, the programming node may be disconnected from a power supply network, thereby enabling a low power operation of the electro-optical element. Amorphous doped transition-metal oxides enable integration into back-end-of-line (BEOL) interconnect structures and do not have birefringence. The inventive electro-optical element may be employed for both the visible and the infrared wavelength spectrum.

According to an aspect of the present invention, an electro-optical device is provided, which comprises:

an optical medium structure comprising an optical medium and configured to receive electromagnetic radiation;

a doped transition metal oxide structure doped with at least one transition metal having at least two valence states and including a doped substantially stoichiometric transition metal oxide region including F-centers, wherein the doped transition metal oxide structure is of integral construction with the optical medium structure or abuts the optical medium structure; and a first electrode and a second electrode located on the doped transition metal oxide structure and configured to move location of the F-centers by electrostatic force, wherein an overlap of a wavefunction of the electromagnetic radiation with the F-centers changes with a movement of the location of the F-centers by the electrostatic force.

The optical medium structure and the doped transition metal oxide structure may be of unitary and integral construction and collectively constitute an integrated structure. Alternately, the optical medium structure and the doped transition metal oxide structure may be two distinct structures in which the doped transition metal oxide structure abuts the optical medium structure. Yet alternately, the doped transition metal oxide structure may be spaced apart from the optical medium structure by a distance such that an evanescent portion of a wavefunction of electromagnetic radiation in the optical medium structure overlaps the doped transition metal oxide structure.

The doped transition metal oxide structure may further comprise a doped oxygen-deficient transition metal oxide region, which comprises a material such as $SrTi_{1-x}M_xO_{3-\delta}$, wherein $\delta=x/2$. The doped substantially stoichiometric transition metal oxide region comprises a material such as $SrTi_{1-x}M_xO_3$, and may be embedded in the doped oxygen-deficient transition metal oxide structure. M is a transition metal, and the number x may be in the range from 0 to about 0.2, and preferably from 0 to about 0.01.

In some embodiments, the electro-optical device is configured to have a first switching state and a second switching state, wherein the F-centers are located in proximity to the first electrode and away from the second switching state in the first switching state, and wherein the F-centers are located in proximity to the second electrode and away from the first electrode in the second switching state.

In some other embodiments, the electro-optical device is configured to provide greater absorption of the electromagnetic radiation in the first switching state than in the second switching state.

According to another aspect of the present invention, a method of forming an electro-optical device is provided, which comprises:

forming an optical medium structure comprising an optical medium and configured to receive electromagnetic radiation on a substrate;

forming a doped transition metal oxide structure doped with at least one transition metal having at least two valence states and including a doped substantially stoichiometric transition metal oxide region including F-centers on the substrate; and forming a first electrode and a second electrode configured to move the location of the F-centers by electrostatic force on the substrate, wherein an overlap of a wavefunction of the electromagnetic radiation with the F-centers changes with a movement of the location of the F-centers by the electrostatic force.

According to yet another aspect of the present invention, a method of operating an electro-optical device is provided, which comprises:

providing an electro-optical device comprising:
an optical medium structure comprising an optical medium and configured to receive electromagnetic radiation;
a doped transition metal oxide structure doped with at least one transition metal having at least two valence states and including a doped substantially stoichiometric transition metal oxide region including F-centers, wherein the doped transition metal oxide structure is of integral construction with the optical medium structure or abuts the optical medium structure; and
a first electrode and a second electrode located on said doped transition metal oxide structure and configured to move location of the F-centers by electrostatic force; and applying a voltage bias across the first electrode and the second electrode, wherein the voltage bias generates an electrostatic field that applies the electrostatic force to, and moves, the location of the F-centers, and wherein an overlap of a wavefunction of the electromagnetic radiation with the F-centers changes with a movement of the location of the F-centers by the electrostatic field.

BRIEF DESCRIPTION OF THE DRAWINGS

FIGS. 2A and 2B are cross-sectional views of a first exemplary electro-optical device in a first switching state and a second switching state, respectively.

FIGS. 3A and 3B are see-through top-down views of a second exemplary electro-optical device in a first switching state and a second switching state, respectively.

FIGS. 6A and 6B are cross-sectional views of a fifth exemplary electro-optical device in a first switching state and a second switching state, respectively.

FIGS. 10A and 10B are vertical cross-sectional views of a ninth exemplary electro-optical device in a first switching state and a second switching state, respectively.

FIGS. 11A and 11B are vertical cross-sectional views of a tenth exemplary electro-optical device in a first switching state and a second switching state, respectively.

FIGS. 12A and 12B are vertical cross-sectional views of an eleventh exemplary electro-optical device in a first switching state and a second switching state, respectively.

FIGS. 13A and 13B are vertical cross-sectional views of a twelfth exemplary electro-optical device in a first switching state and a second switching state, respectively.

DETAILED DESCRIPTION OF THE INVENTION

Figure 1:
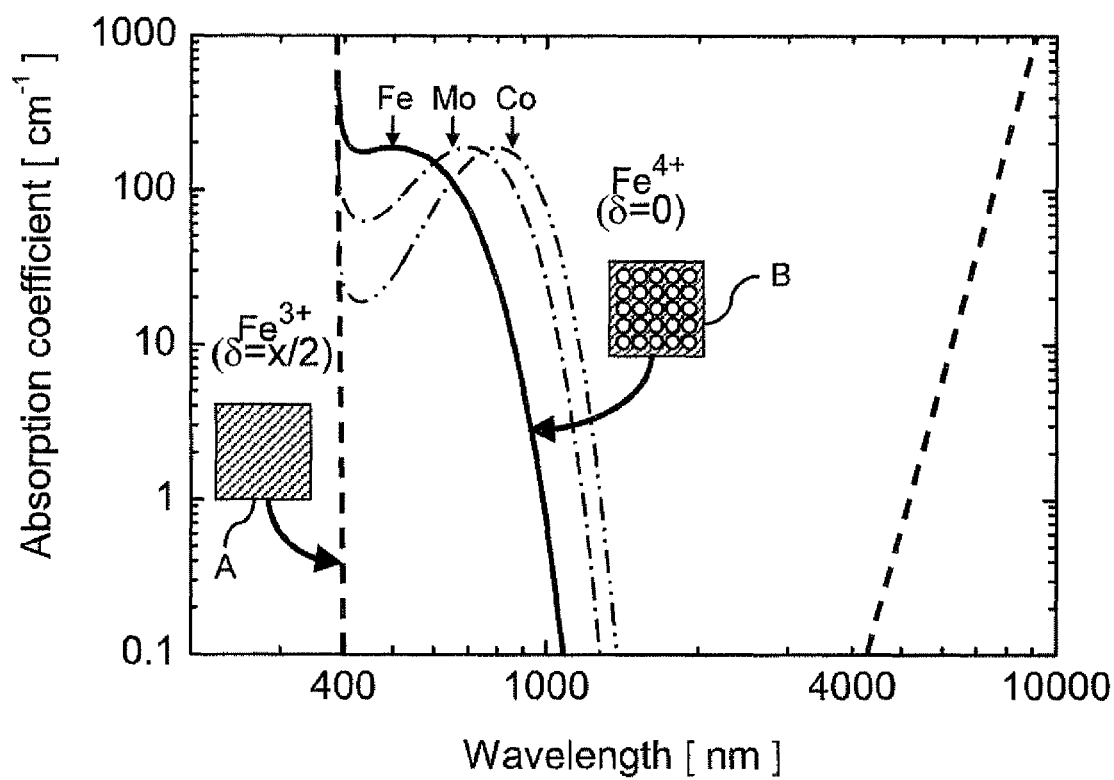
FIG. 1 is a plot of absorption coefficient of $SrTi_{1-x}M_xO_{3-\delta}$ as a function of wavelength of electromagnetic radiation for a stoichiometric value of $\delta$ and a non-stoichiometric value of $\delta$ for each of the cases in which M is Fe, Mo, or Co.

As stated above, the present invention relates to a non-volatile programmable optical element that modulates the absorption coefficient of an optical material with F-center, methods of manufacturing the same, and methods of operating the same, which are now described in detail with accompanying figures. As used herein, when introducing elements of the present invention or the preferred embodiments thereof the articles "a", "an", "the" and "said" are intended to mean that there are one or more of the elements. Throughout the drawings, the same reference numerals or letters are used to designate like or equivalent elements. Detailed descriptions of known functions and constructions unnecessarily obscuring the subject matter of the present invention have been omitted for clarity. The drawings are not necessarily drawn to scale.

Referring to FIG. 1, the absorption coefficient of an exemplary materials employed in the present invention is shown as a function of wavelength. Specifically, the exemplary materials are doped strontium titanium oxide ($SrTi_{1-x}M_xO_3$). The number x may be in the range from 0 to about 0.2, and preferably from 0 to about 0.01, although lesser and greater x may also be employed. The dopant element M is one of the transition metal elements selected from Fe, Mo, and Co. In FIG. 1, the wavelength on the horizontal scale refers to the wavelength of electromagnetic radiation in vacuum.

Once the electromagnetic radiation enters into the material of the doped substantially stoichiometric strontium titanium oxide, the wavelength of light is reduced by a factor of the refractive index of the doped substantially stoichiometric strontium titanium oxide, which is from about 2.31 to about 2.38 depending on the wavelength and the composition of the material. The doped substantially stoichiometric strontium titanium oxide is absorptive in a limited wavelength range, which is a subset of a wavelength range in which doped oxygen-deficient strontium titanium oxide ($SrTi_{1-x}M_xO_{3-\delta}$; $\delta=x/2$) is transparent. The inverse of the distance at which the amplitude of the electromagnetic radiation decreases by a factor of 1/e is the absorption coefficient of the doped substantially stoichiometric strontium titanium oxide.

The dotted lines in FIG. 1 correspond to the absorption coefficient doped oxygen-deficient strontium titanium oxide ($SrTi_{1-x}M_xO_{3-\delta}$; $\delta=x/2$). The doped oxygen-deficient strontium titanium oxide ($SrTi_{1-x}M_xO_{3-\delta}$; $\delta=x/2$) is transparent in the wavelength range from about 400 nm to about 4,000 nm, and becomes gradually absorptive when decreasing the wavelength below 400 nm. The doped oxygen-deficient strontium titanium oxide ($SrTi_{1-x}M_xO_{3-\delta}$; $\delta=x/2$) becomes highly absorptive once the energy of a photon in the electromagnetic radiation exceeds the band gap energy of strontium titanium oxide, which is about 3.2 eV. Further, the absorption coefficient of the doped oxygen-deficient strontium titanium oxide ($SrTi_{1-x}M_xO_{3-\delta}$; $\delta=x/2$) gradually increases with a wavelength above 4,000 nm due to dielectric relaxation, which is a delay in molecular polarization of the dielectric material, i.e., the strontium titanium oxide, in response to the field of the electromagnetic radiation.

In doped substantially stoichiometric strontium titanium oxide ($SrTi_{1-x}M_xO_3$), additional absorption of electromagnetic radiation occurs due to F-centers in the material. An F-center is a type of crystallographic defect in which an anionic vacancy in a crystal is filled by one or more electrons. The electrons are supplied by the atoms of the dopant M, which changes the valence state as an electron or more is donated into the crystal. For example, a Fe atom may normally be in the $Fe^{2+}$ state, and change to the $Fe^{3+}$ state as an electron is donated into crystal lattice. $Fe^{4+}$ may be formed by donating two electrons. Iron with valence 4+ absorbs light at about 500 nm, and iron with valence 3+ absorbs light outside the visible wavelength range. Both $Fe^{4+}$ and $Fe^{3+}$ may be utilized to absorb light. Chromium with valence 4+ absorbs at about 500 μm, and chromium with valence 3+ absorbs light outside the visible wavelength range. Both $Cr^{4+}$ and $Cr^{3+}$ may be utilized to absorb light. Molybdenum with valence 5+ absorbs light at about 700 nm, and molybdenum with valence 4+ absorbs light outside the visible wavelength range. Both $Mo^{5+}$ and $Mo^{4+}$ may be utilized to absorb light. Cobalt with valence 4+ absorbs light at about 800 μm, and cobalt with valence 3+ absorbs light outside the visible wavelength range. Both $Co^{4+}$ and $Co^{3+}$ may be utilized to absorb light. In general, any transition metal having two different valence states may be employed. The electron is localized in an anionic vacancy site of the crystal structure, thereby forming an F-center.

The term "F-center" originates from the German word "Farbenzentrum," in which "Farbe" means color and "Zentrum" means center. Thus, an F-center is sometimes referred to as a color center. F-centers absorb light in a spectral range of electromagnetic radiation including visible spectrum, thereby rendering the material of the doped substantially stoichiometric strontium titanium oxide ($SrTi_{1-x}M_xO_3$) colorful to human eyes. Hence the name "F-center" for the type of defects that induce such coloring of the material. Formation of F-centers require near absence of oxygen vacancies. Since the oxygen vacancies have an effective positive charge, F-centers are formed around a positive potential region if electrical bias is applied across the doped substantially stoichiometric strontium titanium oxide material. In the examples shown in FIG. 1, F-centers absorb light within the wavelength range between 400 nm and about 1,200 nm. The optical absorption coefficient of doped substantially stoichiometric strontium titanium oxide in the wavelength range between about 400 nm and an upper wavelength limit at which the absorption is dominated by dielectric relaxation is proportional to the density of F-centers.

The density of F-centers may be modulated by the transfer of oxygen vacancies in a doped transition metal oxide material. When oxygen deficiencies are introduced into a portion of the doped transition metal oxide material, the F-centers disappear. When oxygen deficiencies are removed from the portion of the doped transition metal oxide material, F-centers are formed since excess electrons become localized. The F-centers are formed when oxygen vacancies are absent. Since oxygen vacancies carry a net positive charge, the F-centers are formed in a positive potential region under electrical bias.

Even a small amount of doping is effective in rendering the doped substantially stoichiometric strontium titanium oxide with the F-centers absorptive. For example, about 1% replacement of Ti with Fe, Mo, or Co is sufficient to cause the absorption coefficient of the doped substantially stoichiometric strontium titanium oxide to be greater than 10/cm over the entire range of the wavelength between 400 nm and 800 nm. The effectiveness of the F-centers in absorbing electromagnetic radiation is dependent on the wavelength of the electromagnetic radiation. The optical absorption due to the F-centers of doped substantially stoichiometric strontium titanium oxide ($SrTi_{1-x}M_xO_3$) becomes insignificant, however, above the wavelength of about 1,500 nm. Thus, the doped substantially stoichiometric strontium titanium oxide ($SrTi_{1-x}M_xO_3$) allows transmission of electromagnetic radiation having a wavelength greater than 1,500 nm, while absorbing electromagnetic radiation have a wavelength less than 800 nm. In case electromagnetic radiation includes many components having different spectral wavelengths, the doped substantially stoichiometric strontium titanium oxide ($SrTi_{1-x}M_xO_3$) of the present invention may be employed to selectively pass some components having longer spectral wavelengths, e.g., greater than 1,500 nm, while absorbing other components having shorter spectral wavelengths, e.g., less than 800 nm. A specific spectral range for absorption of electromagnetic radiation may be obtained by selecting the dopant element in the doped substantially stoichiometric strontium titanium oxide ($SrTi_{1-x}M_xO_3$), see the examples of Fe—, Mo—, and Co-doped $SrTiO_3$ in FIG. 1.

Inset A schematically shows the absence of any F-centers in the doped oxygen-deficient strontium titanium oxide ($SrTi_{1-x}M_xO_{3-\delta}$; $\delta=x/2$). Inset B schematically shows the presence of F-centers in the doped substantially stoichiometric strontium titanium oxide ($SrTi_{1-x}M_xO_3$). The dotted lines represent the bounds for the absorption coefficient for any strontium titanium oxide, doped or undoped, stoichiometric or oxygen-deficient, which is determined by the band gap and the dielectric relaxation. The solid line represents the absorption coefficient for Fe-doped substantially stoichiometric strontium titanium oxide ($SrTi_{1-x}Fe_xO_3$). The single-dotted dashed line represents the absorption coefficient for Mo-doped substantially stoichiometric strontium titanium oxide ($SrTi_{1-x}Mo_xO_3$). The double-dotted dashed line represents the absorption coefficient for Co-doped substantially stoichiometric strontium titanium oxide ($SrTi_{1-x}Co_xO_3$).

Electromagnetic radiation having a wavelength in the absorptive wavelength range of the F-centers is absorbed in doped substantially stoichiometric strontium titanium oxide ($SrTi_{1-x}M_xO_3$). The amount of absorption is proportional to $e^{-\alpha x}$, in which $\alpha$ is the extinction coefficient and x is the distance that the electromagnetic radiation travels through within the absorptive medium. Since an $\alpha$ value exceeding 100/cm is readily obtained in doped substantially stoichiometric strontium titanium oxide ($SrTi_{1-x}M_xO_3$), a 100 micron thick optical medium including doped substantially stoichiometric strontium titanium oxide ($SrTi_{1-x}M_xO_3$) may attenuate light having a wavelength of about 700 nm by a factor exceeding 20,000. Thus, doped substantially stoichiometric strontium titanium oxide ($SrTi_{1-x}M_xO_3$) is very effective in absorbing light in certain wavelength ranges. The F-centers that cause the absorptive characteristics in the doped substantially stoichiometric strontium titanium oxide ($SrTi_{1-x}M_xO_3$) are mobile. In some embodiments, doped substantially stoichiometric strontium titanium oxide may be embedded in a matrix of oxygen-deficient doped strontium titanium oxide ($SrTi_{1-x}M_xO_{3-\delta}$; $\delta>0$) in the present invention.

Within a doped substantially stoichiometric transition metal oxide material portion of the present invention, the location in which F-centers are manifested moves under an applied electrical field because oxygen vacancies, which are positively charged, can drift under an applied electrical field. To induce movement of the oxygen vacancies, an applied electrical field having the electrical field strength of about 10 kV/cm is preferred, which translates to about 1 V of potential difference across the distance of about 1 µm. Thus, by forming electrodes separated by a distance of, for example, 5 µm, sufficient electrical field to move oxygen vacancies may be generated when a bias voltage of 5 V is applied.

Movement of oxygen vacancies enables spatial modulation of F-center concentration in an active region of the electro-optical devices of the present invention. By applying an appropriate voltage signal, F-center regions, i.e., regions including F-centers, are transferred to, or retracted from, an active region of an electro-optical device. A specific optical absorption profile can be programmed into the active region of the electro-optical device with an appropriate programming voltage signal applied to electrodes provided around the active region. The F-center profile in the transition metal oxide material in the active region, and consequently the optical absorption profile thereof, remain unchanged even when the programming voltage signal is turned off. In other words, the optical state of the electro-optical device does not change even when the programming voltage signal is discontinued. Thus, a non-volatile programmable electro-optical device that maintains the optical absorption profile in the absence of applied power is provided.

In general, the present invention provides electro-optical devices employing a doped substantially stoichiometric transition metal oxide that has F-centers, which provides absorptive characteristics as the doped substantially stoichiometric strontium titanium oxide ($SrTi_{1-x}M_xO_3$) described above. Transition metal oxides that may be employed include oxides of any of the elements in Groups IIIA, IVA, VA, VIA, VIIA, VIIIA, VIIIA, VIIIA, IB, and IIB of the Periodic Table of the Elements including Lanthanides and Actinides. The dopant element M may be any of the transition metal elements that may provide at least two different valence states within the doped strontium titanium oxide ($SrTi_{1-x}M_xO_{3-\delta}$).

This type of doped substantially stoichiometric transition metal oxides includes a dopant metal and a base metal oxide material, i.e., an undoped metal oxide material. The dopant metal may be any elemental metal that has at least two different valence states in the base metal oxide material depending on oxygen content of the base metal oxide material. For example, the dopant metal may be any transition metal element, including Lanthanides and Actinides, which may have at least two valence states within the base oxide material. Non-limiting examples of the dopant metal include V, Cr, Mn, Fe, Co, Ni, and Mo. Non-limiting examples of the base metal oxide material include perovskites oxides such as calcium and/or strontium and/or barium titanium oxide (Ca, Sr, Ba)$TiO_3$, strontium zirconium oxide $SrZrO_3$, perovskite-like oxides such as calcium and/or strontium and/or barium titanium oxide (Ca, Sr, Ba)$_2TiO_4$, and binary transition metal oxides such as nickel oxide NiO, and titanium oxide $TiO_2$, As discussed above, the undoped base compounds have a wide band gap. For example, stoichiometric calcium and/or strontium and/or barium titanium oxide (Ca,Sr,Ba)$TiO_3$ and (Ca, Sr, Ba)$_2TiO_4$ have band gaps of about 3.2 eV, and stoichiometric strontium zirconium oxide $SrZrO_3$ has a band gap of about 5.9 eV, stoichiometric nickel oxide NiO has a band gap of about 4.3 eV, and stoichiometric titanium oxide $TiO_2$ has a band gap of about 3.0 eV Other types of base metal oxide materials that may be employed for the doped substantially stoichiometric transition metal oxide of the present invention include, but are not limited to, electrically insulating high-mobility oxygen ion conducting materials, such as cerium gadolinium oxides $Ce_{0.9}Gd_{0.1}O_2$ or bismuth vanadium cupper oxide $Bi_4V_{1.8}Cu_{0.2}O_{11}$, fluorite-type oxides such as yttrium and/or scandium stabilized zirconia $(ZrO_2)_{1-x}((Y,Sc)_2O_3)_x$, bismuth and gadolinium doped ceria $((Ce,Gd)O_2)_{1-x}(Bi_2O_3)_x$, perovskites such as lanthanum and/or strontium gallium and/or magnesium oxide (La,Sr)(Ga,Mg)$O_3$, barium indium oxide $BaInO_{2.5}$, lithium and/or lanthanum titanium oxide (Li,La)$TiO_3$), Aurivilius-type oxides such as bismuth vanadium and/or titanium and/or cupper oxide $Bi_4(V,Ti.Cu)_2O_{11}$, pyrochlores such as gadolinium zirconium and/or titanium oxide $Gd_2(Zr,Ti)_2O_7$, and oxides like lanthanum molybdenum oxide $La_2Mo_2O_9$.

The drift velocity of oxygen vacancies in these materials is temperature dependant. Therefore a heater or thermoelectric element can be used to tune the programming speed of the electro-optical device of the present invention. The heater or the thermoelectric element may be attached directly to a matrix of a doped transition metal oxide structure including a doped substantially stoichiometric transition metal oxide region including F-centers and a doped oxygen-deficient transition metal oxide region that is substantially free of F-centers. Alternately, the heater or thermoelectric element may be indirectly attached to the matrix of the doped transition metal oxide structure through an insulator portion or one of the electrodes employed to move the oxygen deficiencies. The thermoelectric element may be configured to heat the doped transition metal oxide structure, to cool the doped transition metal oxide structure, or to heat and cool the doped transition metal oxide structure as needed. In general, the thermoelectric element may be any device that uses Peltier-Seebeck effect.

In general, the doped substantially stoichiometric transition metal oxide material employed in the present invention has an absorption coefficient from about 1.0/cm to about 1,000,000/cm within the wavelength range for electromagnetic radiation from about 350 nm to about 2,000 m, Referring to FIGS. 2A and 2B, cross-sectional views of a first exemplary electro-optical device are shown according to a first embodiment of the present invention. FIG. 2A shows the first exemplar electro-optical device in a first switching state, and FIG. 2B shows the first exemplary electro-optical device in a second switching state. It is noted that the cross-sectional views of FIGS. 2A and 2B may be horizontal cross-sectional views, vertical cross-sectional views, or any cross-sectional view taken at an angle between a horizontal plane and a vertical plane. It is understood that a structure may be rotated to define a plane that includes the elements of the first exemplary electro-optical device shown herein. All such geometrical rotations are implied in the description of the present invention across all embodiments including the first embodiment.

The first exemplary electro-optical device comprises a doped transition metal oxide structure 10, which is an active device region comprising a transition metal oxide material and located between a first electrode 20 and a second electrode 30. The doped transition metal oxide structure 10 comprises a doped substantially stoichiometric transition metal oxide region including F-centers 9 and a doped oxygen-deficient transition metal oxide region that is substantially free of F-centers. The doped substantially stoichiometric transition metal oxide region is embedded in the doped oxygen-deficient transition metal oxide region.

A region is substantially free of F-centers if the optical properties of the region are the same as a region free of F-centers for the purposes of operation of the electro-optical devices of the present invention. For example, a material having an F-center density that is sufficiently low to provide an absorption coefficient less than 0.1/cm may be considered to be substantially free of F-centers for the purposes of the present invention. The doped substantially stoichiometric transition metal oxide region has greater absorption coefficient for electromagnetic radiation than the doped oxygen-deficient transition metal oxide region within a subset of the frequency range between 350 nm and 2,000 nm. In FIGS. 2A and 2B, the doped substantially stoichiometric transition metal oxide region is represented by the portion of the doped transition metal oxide structure 10 that includes the F-centers 9, and the doped oxygen-deficient transition metal oxide region is represented by the portion of the doped transition metal oxide structure 10 outside the area of the F-centers 9.

In the first exemplary electro-optical device, the doped transition metal oxide structure 10 is also an optical medium structure, i.e., a structure including a material that may be employed as an optical medium. In other words, the doped transition metal oxide structure 10 may be substantially transparent under some conditions for electromagnetic radiation having a wavelength within a range. Thus, the optical medium structure and the doped transition metal oxide structure 10 are implemented within the same physical structure. The doped transition metal oxide structure 10, as an optical medium structure, is configured to receive electromagnetic radiation and to pass the electromagnetic radiation under some conditions. Specifically, the doped transition metal oxide structure 10 blocks the electromagnetic radiation in the first switching state shown in FIG. 2A, and passes the electromagnetic radiation in the second switching state shown in FIG. 2B.

The first exemplary electro-optical device further comprises a first waveguiding structure 40 configured to transmit electromagnetic radiation to the doped transition metal oxide structure 10 and a second waveguiding structure 50 configured to receive the electromagnetic radiation from the doped transition metal oxide structure 10. The first waveguiding structure 40 and the second waveguiding structure may laterally abut the doped transition metal oxide structure 10.

In the first switching state shown in FIG. 2A, the doped substantially stoichiometric transition metal oxide region including F-centers 9 is placed in the path of electromagnetic radiation 70. A voltage bias is applied across the first electrode 20 and the second electrode 30 such that the first electrode 20 is at a positive potential relative to the second electrode 30. The voltage bias generates an electrostatic field that applies electrostatic force to, and moves, the oxygen deficiencies away from the first electrode so that F-centers 9 are present in an F-center region located in proximity to the first electrode. The F-center region coincides with the doped substantially stoichiometric transition metal oxide region.

Preferably, the magnitude of the voltage bias is selected to provide an electric field having an electric field strength of about 10 kV/cm, which translates to about 1 V of potential difference across the distance of about 1 μm, although greater or lesser electric field strengths are also contemplated herein. Although the oxygen deficiencies move in the doped transition metal oxide structure 10, the net effect of the movement of the oxygen vacancies is the movement of the F-center region including the F-centers 9. Thus, the result of the application of electrical bias is an apparent movement of the F-center region toward a region of a higher electrostatic potential. The F-center region is attracted to the first electrode 20 and repelled from the second electrode 30. The movement of the F-centers region close to the first electrode 20 and away from the second electrode 30 causes the doped substantially stoichiometric transition metal oxide region to be placed directly in the path of the electromagnetic radiation 70.

The wavefunction of the electromagnetic radiation 70 overlaps the F-centers 9. The absorptive properties of the F-centers 9 affect the wavefunction of the electromagnetic radiation 70. Due to the significantly high absorption coefficient of the doped substantially stoichiometric transition metal oxide region for the electromagnetic radiation 70 having a wavelength from about 350 nm to about 2,000 nm, the electromagnetic radiation 70 is absorbed in the doped substantially stoichiometric transition metal oxide region. The lateral dimension of the doped transition metal oxide structure 10, i.e., the dimension of the doped transition metal oxide structure 10 in the direction of the electromagnetic radiation 70, is selected to sufficiently absorb the electromagnetic radiation.

The first exemplary electro-optical device is non-volatile so that the location of the doped substantially stoichiometric transition metal oxide region including F-centers 9, as shown in FIG. 2A, remains the same even after the bias voltage to the first and second electrodes (20, 30) is discontinued. In other words, the first switching state is maintained indefinitely while no bias voltage is applied to the first and second electrodes (20, 30).

The first switching state may be changed into the second switching state shown in FIG. 2B by moving the F-centers region away from the first electrode 20 toward the second electrode 30. In the second switching state, the doped substantially stoichiometric transition metal oxide region including F-centers 9 is placed out of the path of electromagnetic radiation 70. A voltage bias is applied across the first electrode 20 and the second electrode 30 such that the second electrode 30 is at a positive potential relative to the first electrode 20. The voltage bias generates an electrostatic field that applies electrostatic force to, and moves, the oxygen deficiencies as discussed above, which effectively moves the F-center region containing the F-centers 9. However, the direction of the electrical field is reversed during the switching into the second switching state. This causes the F-centers region including the F-centers to be attracted to the second electrode 30 and repelled from the first electrode 20. The movement of the F-centers 9 toward the second electrode 30 and away from the first electrode 20 causes the doped substantially stoichiometric transition metal oxide region to be placed out of the path of the electromagnetic radiation 70.

The overlap of the wavefunction of the electromagnetic radiation 70 with the F-centers 9 is altered significantly with the movement of the F-centers 9. Preferably, the overlap of the wavefunction of the electromagnetic radiation 70 with the F-centers 9 becomes zero, or is reduced to an insignificant level for the purposes of the operation of the first exemplary electro-optical device. In other words, the absorptive properties of the F-centers 9 do not affect the wavefunction of the electromagnetic radiation 70 due to the lack of overlap between the wavefunction of the electromagnetic radiation 70 and the F-centers 9. Instead, the electromagnetic radiation 70 impinges on the doped oxygen-deficient transition metal oxide region, which does not absorb the electromagnetic radiation 70. Thus, the electromagnetic radiation 70 passes through the doped transition metal oxide structure 10 unattenuated, and into the second waveguiding structure 50, if present.

Thus, the doped substantially stoichiometric transition metal oxide region is located in the path of the electromagnetic radiation 70 in the first switching state, and the doped substantially stoichiometric transition metal oxide region is located outside the path of the electromagnetic radiation 70 in the second switching state. The first exemplary electro-optical device is configured to provide greater absorption of the electromagnetic radiation 70 in the first switching state than in the second switching state. Depending on the degree of oxygen deficiency in the doped transition metal oxide structure 10, the dimensions of the doped transition metal oxide structure 10, and the wavelength of the electromagnetic radiation 70, the first exemplary electro-optical device may completely block the electromagnetic radiation 70, or may pass an attenuated beam through.

The first exemplary electro-optical device is non-volatile so that the location of the doped substantially stoichiometric transition metal oxide region including F-centers 9, as shown in FIG. 2B, remains the same even after the bias voltage to the first and second electrodes (20, 30) is discontinued. Thus, the second switching state is maintained indefinitely while no bias voltage is applied to the first and second electrodes (20, 30). Whether the first exemplary electro-optical structure is in the first switching state or in the second switching state, the switching state of the first exemplary electro-optical structure is maintained in the absence of applied voltage bias across the first and second electrodes (20, 30).

In this case, the first exemplary electro-optical device constitutes an optical switch that passes the electromagnetic radiation 70 or blocks or attenuates the electromagnetic radiation 70. The first exemplary electro-optical device comprises a waveguiding structure in which the doped transition metal oxide structure 10 constitutes a waveguide core. The waveguide core, the optical medium structure, and the doped transition metal oxide structure are one and the same in the first exemplary electro-optical structure of FIGS. 2A and 2B.

Passing electromagnetic radiation through a doped transition metal oxide structure is not necessarily required, however, to practice the present invention. An optical medium structure configured to receive electromagnetic radiation may be a different structure from a doped transition metal oxide structure. Other exemplary electro-optical structures having such characteristics are also provided by the present invention.

Referring to FIGS. 3A and 3B, a second exemplary electro-optical structure is shown in see-through top-down views according to a second embodiment of the present invention. The second exemplary electro-optical structure employs a doped transition metal oxide structure 12 that is distinct from an optical medium structure (not shown) that underlies a doped transition metal oxide structure 12. FIG. 3A shows the second exemplary electro-optical structure in a first switching state in which a doped substantially stoichiometric transition metal oxide region including F-centers 9 overlies a path of electromagnetic radiation 70. FIG. 3B shows the second exemplary electro-optical structure in a second switching state in which a doped oxygen-deficient transition metal oxide region substantially free of F-centers 9 overlies or underlies the path of the electromagnetic radiation 70.

While the second exemplary electro-optical structure employs an optical medium structure that underlies the doped transition metal oxide structure 12, it is understood that a structure may be rotated 180 degrees so that an underlying structure becomes an overlying structure. Further, it is noted that an optical medium structure located to one side of the doped transition metal oxide structure 12 may be rotated so that the optical medium structure overlies or underlies the doped transition metal oxide structure 12. All such geometrical rotations are implied in the description of the present invention across all embodiments.

The second exemplary electro-optical structure comprises the doped transition metal oxide structure 12, the optical medium structure that underlies the doped transition metal oxide structure and aligned to a waveguiding structure 40', a first electrode 20 and a second electrode. The optical medium structure may comprise a waveguide core, and the doped transition metal oxide structure 12 may comprise a waveguide cladding, i.e., a layer that abuts, surrounds, or encloses the surfaces of the waveguide core. The F-centers move between the first electrode 20 and the second electrode 30 in the same manner as in the first embodiment. Electromagnetic radiation 70 passes through the waveguiding structure 40' and into the doped transition metal oxide structure 12 because the wavefunction of the electromagnetic radiation extends outside of the waveguiding structure 40' into the doped transition metal oxide structure 12 with an exponential decay in magnitude with distance from the surface of the optical medium structure. Thus, the wavefunction of the electromagnetic radiation senses the presence or absence of the F-centers 9 within the volume of the evanescent field of the electromagnetic radiation in the doped transition metal oxide structure 12.

The geometry of the doped transition metal oxide structure 12 is configured such that the coupling of the evanescent field portion of the wavefunction of the electromagnetic radiation 70 overlaps more with the doped substantially stoichiometric transition metal oxide region including F-centers 9 in the first switching state relative to the second switching state. This may be achieved be changing the distance between the optical medium structure and the doped substantially stoichiometric transition metal oxide region including the F-centers between the first switching state and the second switching state. For example, the first electrode 20 may be placed in closer proximity to the optical medium structure that the second electrode 30. The movement of the F-centers 9 within the doped transition metal oxide structure 12 may be effected in the same manner as the movement of the F-centers 9 within the doped transition metal oxide structure 10 in the first embodiment.

In the second exemplary electro-optical device, the doped substantially stoichiometric transition metal oxide region is located outside a path of the electromagnetic radiation in the first and second switching states. However, the doped substantially stoichiometric transition metal oxide region is located in closer proximity to the electromagnetic radiation 70 in the first switching state than in the second switching state. The differences in physical proximity between the optical medium structure and the doped substantially stoichiometric transition metal oxide region including the F-centers 9 results in different amount of absorption of the electromagnetic radiation 70 in the doped transition metal oxide structure 12. The second exemplary electro-optical device passes the electromagnetic radiation 70 in the first switching state, and blocks or attenuates the electromagnetic radiation 70 in the second switching state by altering the light absorption in the doped transition metal oxide structure 12, which is not located directly in the path of the electromagnetic radiation 70 but couples with the evanescent portion of the wavefunction of the electromagnetic radiation due to the quantum electrodynamic nature of light. If the optical medium structure is a waveguiding structure, the doped transition metal oxide structure 12 is a cladding structure. In this case, the light absorption in the cladding structure is modulated by the movement of the F-centers 9 within the cladding structure.

Figure 4A:
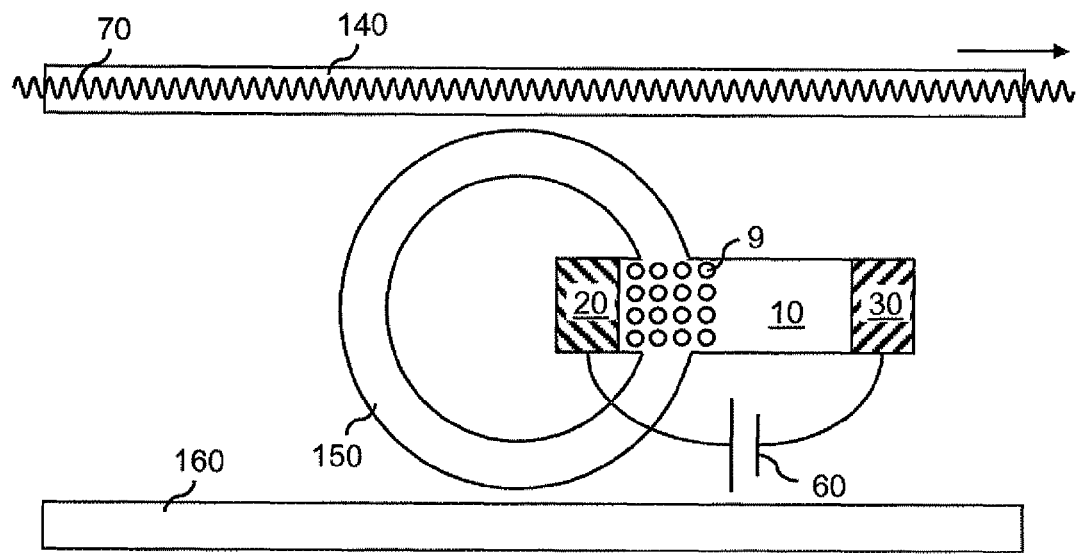
FIGS. 4A and 4B are cross-sectional views of a third exemplary electro-optical device in a first switching state and a second switching state, respectively.
Figure 4B:
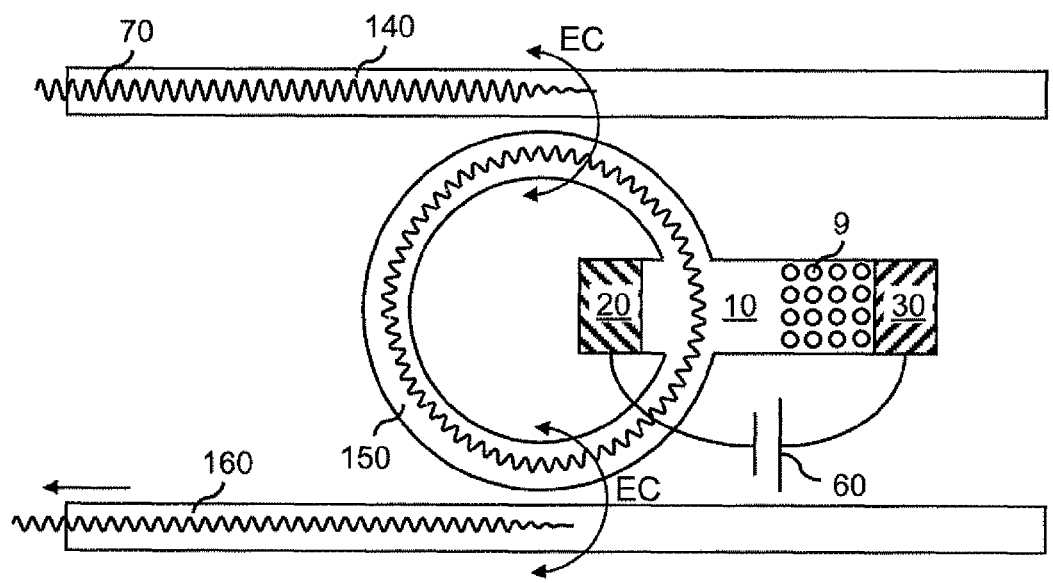

FIGS. 4A and 4B are cross-sectional views of a third exemplary electro-optical device in a first switching state and a second switching state, respectively, according to a third embodiment of the present invention. The third exemplary electro-optical device includes an optical switch located in the path a ring resonator 150, a first waveguiding structure 140 placed in close proximity to the ring resonator 150, and a second waveguiding structure 160 placed in close proximity to the ring resonator 150. The optical switch includes an assembly of a doped transition metal oxide structure 10, a first electrode 20, and a second electrode 30, which may be the same as an assembly of transition metal oxide structure 10, a first electrode 20, and a second electrode 30 in the first exemplary electro-optical device of the first embodiment.

The distance between the first waveguiding structure 140 and the ring resonator 150 is small enough to enable evanescent coupling between a beam of electromagnetic radiation in the first waveguiding structure 140 and another beam of electromagnetic radiation in the ring resonator 150. Typically, the distance between the first waveguiding structure 140 and the ring resonator 150 is less than about 5 times the wavelength of the electromagnetic radiation to be evanescently coupled, and preferably less than about 3 times the wavelength of the electromagnetic radiation to be coupled, and more preferably about the same, or less than, the wavelength of the electromagnetic radiation to be coupled. The distance between the second waveguiding structure 160 and the ring resonator 150 is small enough to enable evanescent coupling between a beam of electromagnetic radiation in the ring resonator 150 and another beam of electromagnetic radiation in the second waveguiding structure 160.

In the first switching state shown in FIG. 4A, a doped substantially stoichiometric transition metal oxide region including F-centers 9 is placed in the beam path of the ring resonator 150. The first switching state is enabled by moving the F-centers 9 into the beam path of the ring resonator 150 by electrostatic means as described above. In the first switching state, a standing wave of electromagnetic radiation cannot be formed within the ring resonator 150 because the beam path is blocked by the doped substantially stoichiometric transition metal oxide region. Thus, the evanescent field of the electromagnetic radiation 70 in the first waveguiding structure 140 cannot generate any standing wave of electromagnetic radiation in the ring resonator 150. The entirety of the electromagnetic radiation 70 passes through the first waveguiding structure 140 without any quantum electrodynamic interference with the ring resonator 150.

In the second switching state shown in FIG. 4B, the doped substantially stoichiometric transition metal oxide region including F-centers 9 is removed from the beam path. Instead, a doped oxygen-deficient transition metal oxide portion is formed in the beam path portion of the doped transition metal oxide structure 10. The second switching state is enabled by moving the F-centers 9 out of the beam path of the ring resonator 150 by electrostatic means as described above. In the second switching state, a standing wave of electromagnetic radiation is enabled within the ring resonator 150. Thus, the evanescent field of the electromagnetic radiation 70 in the first waveguiding structure 140 couples with the ring resonator 150 and generates a standing wave of electromagnetic radiation, which is maintained within the ring resonator 150 by constructive interference in the wavefunction of the electromagnetic radiation. The standing wave of the electromagnetic radiation in the ring resonator 150 evanescently couples with the second waveguiding structure 160. A beam of electromagnetic radiation is generated in the second waveguiding structure 160. The beam of electromagnetic radiation in the second waveguiding structure 160 travels in the opposite direction of the beam of electromagnetic radiation in the first waveguiding structure 140. The evanescent couplings between beams of electromagnetic radiation are schematically shown by the arrows labeled "EC." The third exemplary electro-optical device is capable of switching the output beam of electromagnetic radiation between two different waveguiding structures (140, 160).

Figure 5A:
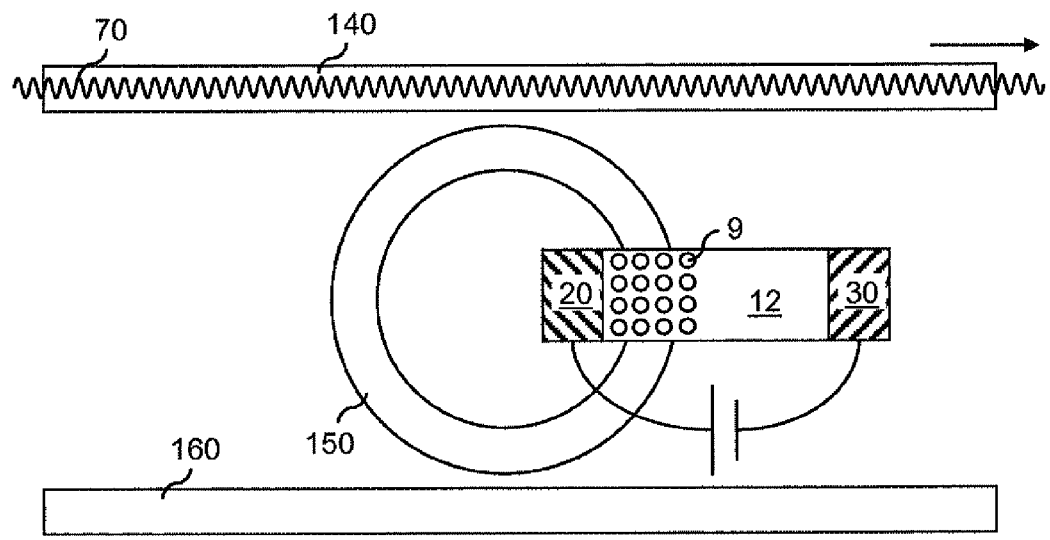
FIGS. 5A and 5B are see-through top-down views of a fourth exemplary electro-optical device in a first switching state and a second switching state, respectively.
Figure 5B:
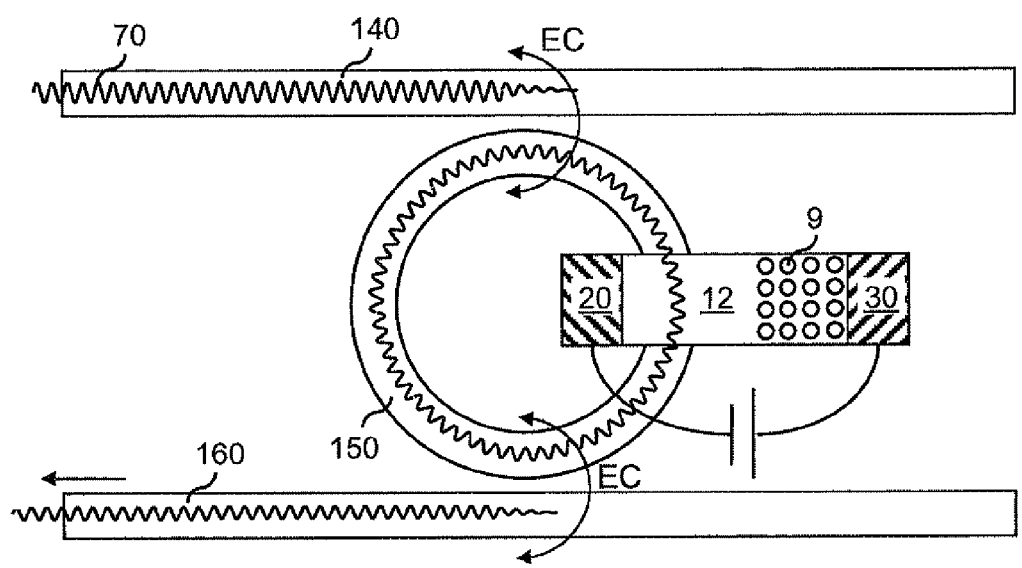

FIGS. 5A and 5B are see-through top-down views of a fourth exemplary electro-optical device in a first switching state and a second switching state, respectively, according to a fourth embodiment of the present invention. The fourth exemplary electro-optical device includes an optical switch overlying or underlying a ring resonator 150, a first waveguiding structure 140 placed in close proximity to the ring resonator 150, and a second waveguiding structure 160 placed in close proximity to the ring resonator 150. The optical switch includes an assembly of a doped transition metal oxide structure 12, a first electrode 20, and a second electrode 30, which may be the same as an assembly of transition metal oxide structure 12, a first electrode 20, and a second electrode 30 in the second exemplary electro-optical device of the second embodiment.

The distance between the first waveguiding structure 140 and the ring resonator 150 is small enough to enable evanescent coupling as in the third embodiment. Likewise, the distance between the second waveguiding structure 160 and the ring resonator 150 is small enough to enable evanescent coupling as in the third embodiment.

In the first switching state shown in FIG. 5A, a doped substantially stoichiometric transition metal oxide region including F-centers 9 overlies or underlies the beam path of the ring resonator 150. The first switching state is enabled by moving the F-centers 9 to the portion of the doped transition metal oxide structure 12 that overlies or underlies the beam path of the ring resonator 150 by electrostatic means as described above. In the first switching state, a standing wave of electromagnetic radiation cannot be formed within the ring resonator 150 because any wavefunction of electromagnetic radiation couples with the F-centers 9 by evanescent coupling so that the electromagnetic radiation cannot pass through the portion of the ring oscillator 150 that underlies or overlies the doped transition metal oxide structure 12. Thus, the evanescent field of the electromagnetic radiation 70 in the first waveguiding structure 140 cannot generate any standing wave of electromagnetic radiation in the ring resonator 150. The entirety of the electromagnetic radiation 70 passes through the first waveguiding structure 140 without any quantum electrodynamic interference with the ring resonator 150.

In the second switching state shown in FIG. 5B, the doped substantially stoichiometric transition metal oxide region including F-centers 9 is removed from the portion of the doped transition metal oxide structure 12 that overlies or underlies the beam path of the ring resonator 150. Instead, a doped oxygen-deficient transition metal oxide portion is formed in the portion of the doped transition metal oxide structure 12 that overlies or underlies the beam path of the ring resonator 150. The second switching state is enabled by moving the F-centers 9 out of the portion of the doped transition metal oxide structure 12 that overlies or underlies the beam path of the ring resonator 150 by electrostatic means as described above. In the second switching state, a standing wave of electromagnetic radiation is enabled within the ring resonator 150 as in the second switching state of the third embodiment in FIG. 4B. Thus, the evanescent field of the electromagnetic radiation 70 in the first waveguiding structure 140 couples with the ring resonator 150 and generates a standing wave of electromagnetic radiation, which is maintained within the ring resonator 150 by constructive interference in the wavefunction of the electromagnetic radiation. The standing wave of the electromagnetic radiation in the ring resonator 150 evanescently couples with the second waveguiding structure 160. A beam of electromagnetic radiation is generated in the second waveguiding structure 160 as in the second switching state of the third embodiment. The evanescent couplings between beams of electromagnetic radiation are schematically shown by the arrows labeled "EC." The fourth exemplary electro-optical device is capable of switching the output beam of electromagnetic radiation between two different waveguiding structures.

Figure 6A:
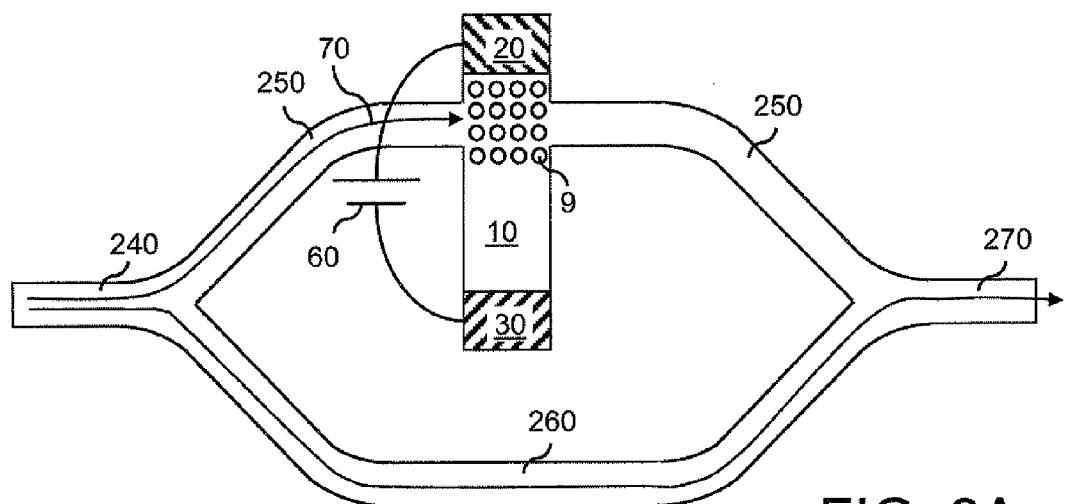
Figure 6A:
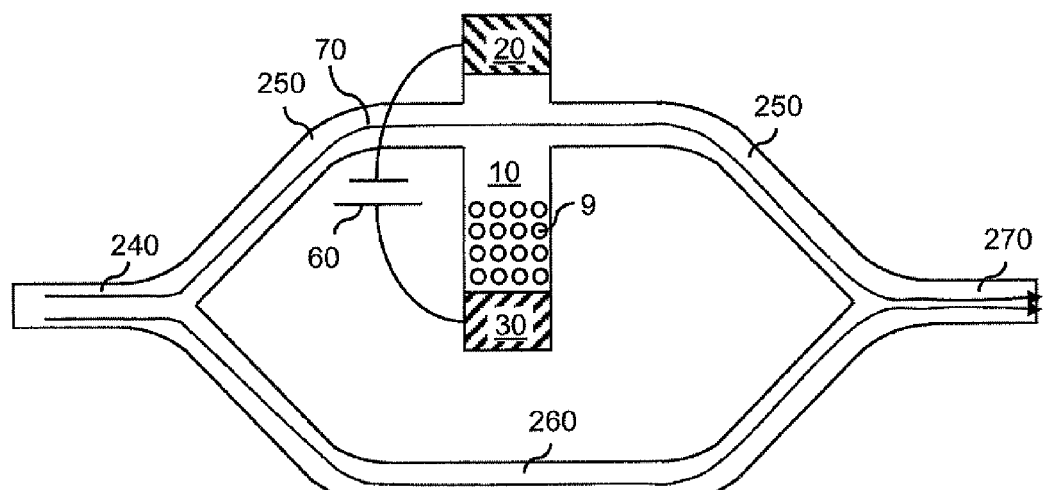

FIGS. 6A and 6B are cross-sectional views of a fifth exemplary electro-optical device according to a fifth embodiment of the present invention. FIG. 6A is a cross-sectional view of the fifth exemplary electro-optical device in a first switching state. The fifth exemplary electro-optical device functions as a Mach-Zehnder modulator including an assembly of a doped transition metal oxide structure 10, a first electrode 20, and a second electrode 30. The assembly functions as an optical switch. The assembly of a doped transition metal oxide structure 10, a first electrode 20, and a second electrode 30 may be the same as an assembly of transition metal oxide structure 10, a first electrode 20, and a second electrode 30 in the first exemplary electro-optical device of the first embodiment. The operation of the optical switch (10, 20, 30) is the same as in the first embodiment. The beam path is blocked by a doped substantially stoichiometric transition metal oxide portion that includes F-centers 9.

FIG. 6B is a cross-sectional view of the fifth exemplary electro-optical device in a second switching state. A doped oxygen-deficient transition metal oxide region substantially free of F-centers 9 is placed in the path of the electromagnetic radiation 70. The beam passes through the doped transition metal oxide structure 10 in the second switching state. Embodiments in which an optical switch (12, 20, 30; See FIGS. 3A and 3B) from the second exemplary electro-optical device is employed instead of the optical switch (10, 20, 30) are explicitly contemplated herein.

Figure 7A:
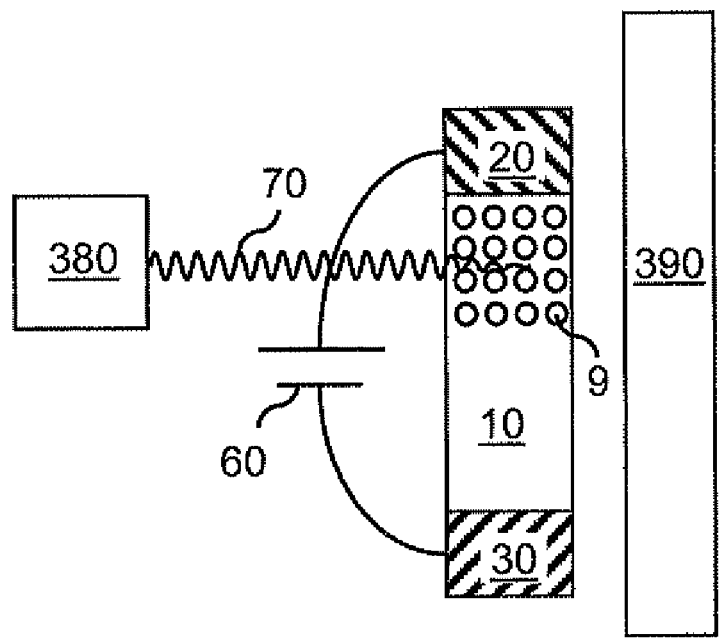
FIGS. 7A and 7B are cross-sectional views of a sixth exemplary electro-optical device in a first switching state and a second switching state, respectively.
Figure 7B:
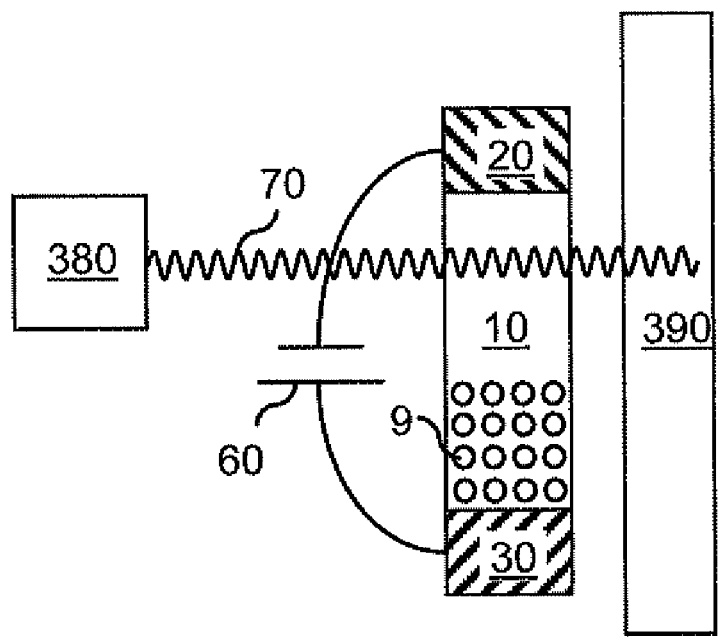

FIGS. 7A and 7B are cross-sectional views of a sixth exemplary electro-optical device according to a sixth embodiment of the present invention. FIG. 7A is a cross-sectional view of the sixth exemplary electro-optical device in a first switching state, and FIG. 7B is a cross-sectional view of the sixth exemplary electro-optical device in a second switching state. The sixth exemplary electro-optical device comprises an optical switch including a doped transition metal oxide structure 10, a first electrode 20, and a second electrode 30. The optical switch (10, 20, 30) may be substantially the same as the assembly of the doped transition metal oxide structure 10, the first electrode 20, and the second electrode 30 in the first exemplary electro-optical structure described above. The sixth exemplary electro-optical structure further comprises a light source 380 and a screen element 390. The sixth exemplary electro-optical device may be employed as a display element, in which electromagnetic radiation 70 may be blocked or transmitted depending on the signal on the first and second electrodes (20, 30). In the first switching state, the electromagnetic radiation 70 is blocked, and in the second switching state, the electromagnetic radiation passes through the optical switch (10, 20, 30) onto the screen element 390.

Figure 8A:
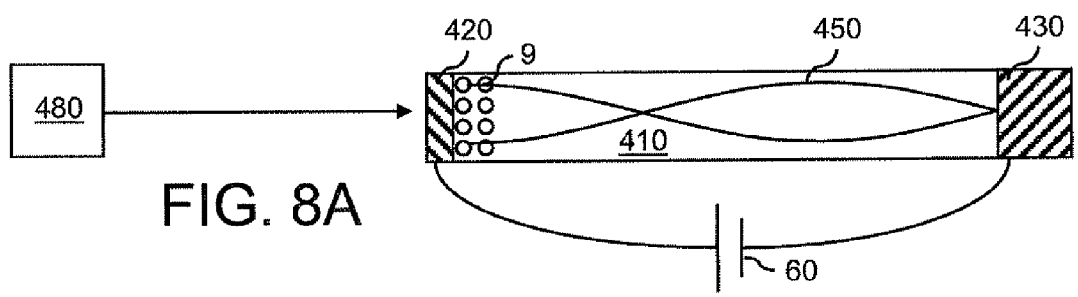
FIGS. 8A and 8B are cross-sectional views of a seventh exemplary electro-optical device in a first switching state and a second switching state, respectively.
Figure 8B:
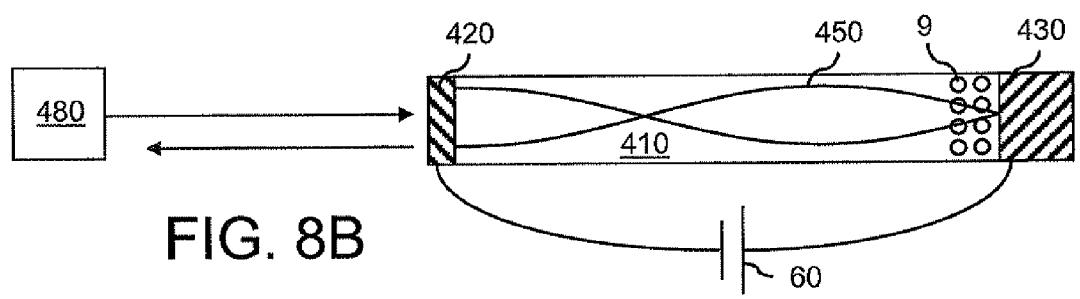

FIGS. 8A and 8B are cross-sectional views of a seventh exemplary electro-optical device according to a seventh embodiment of the present invention. FIG. 8A is a cross-sectional view of the seventh exemplary electro-optical device in a first switching state, and FIG. 8B is a cross-sectional view of the seventh exemplary electro-optical device in a second switching state. The seventh exemplary electro-optical device comprises a programmable reflector including a doped transition metal oxide structure 410, a first electrode 420, and a second electrode 430. The seventh exemplary electro-optical device further comprises a light source that generates electromagnetic radiation (represented by an arrow pointing to the right in FIGS. 8A and 8B), which may be monochromatic.

The first electrode 420 may comprise an optically transparent material at the wavelength range of the electromagnetic radiation, or may be thin enough to affect the electromagnetic radiation in any significant way. The second electrode 430 comprises a reflective material and thick enough to reflect the electromagnetic radiation. The length of the doped transition metal oxide structure 410 is selected so that a node of a standing wave 450 is formed at the interface between the doped transition metal oxide structure 410 and the second electrode 430 and an antinode of the standing wave 450 is formed at the interface between the doped transition metal oxide structure 410 and the first electrode 420.

In the first switching state shown in FIG. 8A, a bias voltage is applied across the first electrode 420 and the second electrode 430 such that the first electrode 420 is held at a negative potential relative to the second electrode 430. A doped substantially stoichiometric transition metal oxide region including F-centers 9 is formed near the first electrode 420 as the F-center region including the F-centers 9 is attracted to the first electrode 420 and repelled from the second electrode 430. The F-centers 9 are thus formed in proximity to the first electrode 420 and away from the second electrode 430. The rest of the doped transition metal oxide structure 410 comprises a doped oxygen-deficient transition metal oxide region. Since the amplitude of the wavefunction of the standing wave 450 of the electromagnetic radiation is non-zero in the doped substantially stoichiometric transition metal oxide region including the F-centers 9, the F-centers 9 couple with the wavefunction of the standing wave 450 of the electromagnetic radiation, thereby absorbing the standing wave 450 of the electromagnetic radiation. If the absorption of the electromagnetic radiation is sufficient, all or most of the electromagnetic radiation may be absorbed by the F-centers 9. In this case, no reflected beam exits the doped transition metal oxide structure 410. The first switching state may be maintained even after the bias voltage to the first and second electrodes (420, 430) is turned off.

In the second switching state shown in FIG. 8B, a bias voltage is applied across the first electrode 420 and the second electrode 430 such that the second electrode 430 is held at a negative potential relative to the first electrode 420. The doped substantially stoichiometric transition metal oxide region including F-centers 9 is formed near the second electrode 430 as the F-center region including F-centers 9 is attracted to the second electrode 430 and repelled from the first electrode 420. Thus, the F-centers 9 are formed in proximity to the second electrode 430 and away from the first electrode 420. The rest of the doped transition metal oxide structure 410 comprises a doped oxygen-deficient transition metal oxide region. Since the amplitude of the wavefunction of the standing wave 450 of the electromagnetic radiation is near zero in the doped substantially stoichiometric transition metal oxide region including the F-centers 9, coupling between the F-centers 9 and the wavefunction of the standing wave 450 of the electromagnetic radiation is minimal. Thus, the F-centers do not absorb the electromagnetic radiation in a significant manner. The electromagnetic radiation is reflected off the second electrode 430 and sent back in the direction that is opposite to the direction of the incident electromagnetic radiation. Thus, the incident electromagnetic radiation may be absorbed or reflected depending on the switching state of the seventh exemplary electro-optical device. Embodiments in which the incident electromagnetic radiation impinges on the doped transition metal oxide structure 410 at a non-orthogonal angle are also contemplated herein.

Figure 9A:
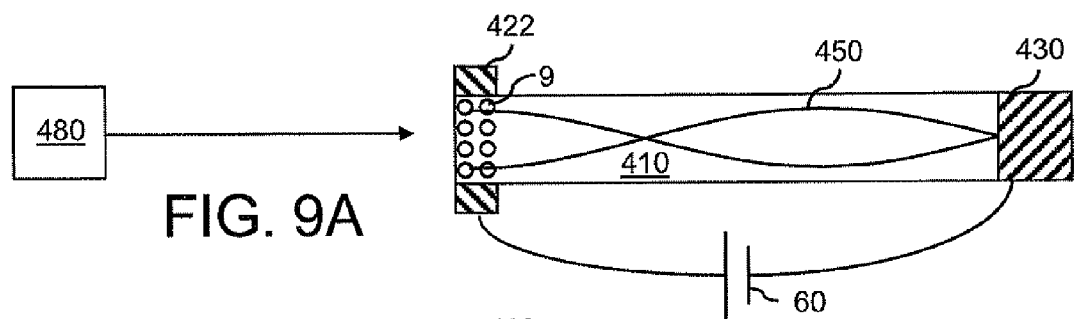
FIGS. 9A and 9B are cross-sectional views of an eighth exemplary electro-optical device in a first switching state and a second switching state, respectively.
Figure 9B:
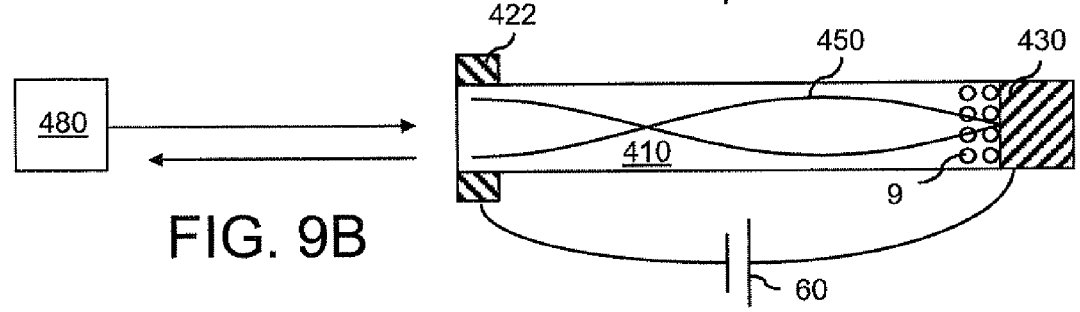

FIGS. 9A and 9B are cross-sectional views of an eighth exemplary electro-optical device according to an eighth embodiment of the present invention. FIG. 9A is a cross-sectional view of the eighth exemplary electro-optical device in a first switching state, and FIG. 9B is a cross-sectional view of the eighth exemplary electro-optical device in a second switching state. The eighth exemplary electro-optical device comprises an annular first electrode 422, which performs the functions of the first electrode 420 of the seventh exemplary electro-optical structure of the seventh embodiment, but is placed out of the path of the incident and reflected beam of electromagnetic radiation. The eighth exemplary electro-optical device operates in the same manner as the seventh exemplary electro-optical device.

FIGS. 10A and 10B are vertical cross-sectional views of a ninth exemplary electro-optical device according to a ninth embodiment of the present invention. FIG. 10A is a vertical cross-sectional view of the ninth exemplary electro-optical device in a first switching state, and FIG. 10B is a vertical cross-sectional view of the ninth exemplary electro-optical device in a second switching state. The ninth exemplary electro-optical device may be formed on a substrate including a first electrode 520 and a dielectric material layer 502. A waveguiding structure 504, which is an optical medium structure comprising an optical medium and configured to pass electromagnetic radiation, is formed on the dielectric material layer 502. A doped transition metal oxide structure 510 is formed directly on the top surface and sidewalls of the waveguiding structure 504, for example, by deposition. The doped transition metal oxide structure 510 may be planarized as needed. A second electrode 530 is formed on top of the doped transition metal oxide structure 510. The waveguiding structure 504 and the doped transition metal oxide structure 510 comprise different materials. For example, the waveguiding structure 504 may have a higher refractive index than the material of the doped transition metal oxide structure 510 and the material of the dielectric material layer 502 to induce a total reflection condition at the surfaces of the waveguiding structure 504.

In the first switching state shown in FIG. 10A, the F-centers 9 are located in proximity to the first electrode 520 and away from the second electrode 530 because of a bias voltage across the first and second electrodes (520, 530). The bias voltage may be applied as a voltage pulse. Preferably, the magnitude and duration of the voltage pulse is controlled so that the F-centers 9 are located above, and in proximity to, the top surface of the waveguiding structure 504. A doped substantially stoichiometric transition metal oxide region thus abuts the top surface of the waveguiding structure 504. When the waveguiding structure 504 receives electromagnetic radiation, the evanescent portion of the wavefunction of the electromagnetic radiation in the doped transition metal oxide structure 510 couples with the F-centers 9 in the doped substantially stoichiometric transition metal oxide region, which comprises an oxygen deficient stoichiometric transition metal oxide material. The evanescent coupling of the wavefunction of the electromagnetic radiation with the F-centers 9 induces absorption of the electromagnetic radiation by the F-centers 9. Thus, the electromagnetic radiation may be completely absorbed or attenuated by the F-centers 9.

In the second switching state shown in FIG. 10B, the F-centers 9 are located in proximity to the second electrode 530 and away from the first electrode 520 due to a bias voltage across the first and second electrodes (520, 530). The doped substantially stoichiometric transition metal oxide region is repelled from the top surface of the waveguiding structure 504. The top surface of the waveguiding structure 504 vertically abuts a doped oxygen-deficient transition metal oxide region, which does not have absorptive characteristics. When the waveguiding structure 504 receives electromagnetic radiation, the coupling between evanescent portion of the wavefunction of the electromagnetic radiation in the doped transition metal oxide structure 510 with the F-centers 9 in the doped substantially stoichiometric transition metal oxide region is significantly reduced since the magnitude of the evanescent portion of the wavefunction exponentially decreases with distance from the surfaces of the waveguiding structure 504. In the second switching state, the evanescent coupling of the wavefunction of the electromagnetic radiation with the F-centers 9 is insignificant so that little or no absorption of the electromagnetic radiation occurs in the doped transition metal oxide structure 510. Thus, the electromagnetic radiation passes through the waveguiding structure 504 without attenuation.

FIGS. 11A and 11B are vertical cross-sectional views of a tenth exemplary electro-optical device according to a tenth embodiment of the present invention. FIG. 11A is a vertical cross-sectional view of the tenth exemplary electro-optical device in a first switching state, and FIG. 11B is a vertical cross-sectional view of the tenth exemplary electro-optical device in a second switching state. The tenth exemplary electro-optical device may be formed on a substrate including a second electrode 530 and a dielectric material layer 502. A waveguiding structure 512, which is an optical medium structure comprising an optical medium and configured to pass electromagnetic radiation, is formed on the dielectric material layer 502. For example, the waveguiding structure 512 may be a rib waveguide having a central portion employed to transmit electromagnetic radiation and side portions having a lesser thickness than the central portion. An upper dielectric material layer 540 is formed directly on the top surface and sidewalls of the waveguiding structure 504. A first electrode 522 is formed on top of the upper dielectric material layer 540.

The waveguiding structure 512 is an optical medium structure and a doped transition metal oxide structure at the same time. In other words, the waveguiding structure 512 comprises a transition metal oxide material of the present invention as described above. The material of the waveguiding structure 512 is employed as an optical medium as well. Preferably, the waveguiding structure 512 has a higher refractive index than the materials of the dielectric material layer 502 and the upper dielectric material layer 540 to induce a total reflection condition at the surfaces of the waveguiding structure 512.

In the first switching state shown in FIG. 11A, the F-center region including the F-centers 9 is attracted toward the first electrode 522 and repelled from the second electrode 532 by a bias voltage across the first and second electrodes (522, 532). A doped substantially stoichiometric transition metal oxide region is formed in an upper portion of the waveguiding structure 512. When the waveguiding structure 512 receives electromagnetic radiation, the wavefunction of the electromagnetic radiation overlaps with the F-centers 9 in the doped substantially stoichiometric transition metal oxide region, which comprises an oxygen deficient stoichiometric transition metal oxide material. The overlap of the wavefunction of the electromagnetic radiation with the F-centers 9 induces absorption of the electromagnetic radiation by the F-centers 9. Thus, the electromagnetic radiation may be completely absorbed or attenuated by the F-centers 9.

In the second switching state shown in FIG. 11B, the F-center region including F-centers 9 is attracted to the second electrode 532 and repelled from the first electrode 522 by a bias voltage across the first and second electrodes (522, 532). The doped substantially stoichiometric transition metal oxide region is repelled from the upper portion of the waveguiding structure 512, and moves to a bottom surface of the waveguiding structure 512. The movement of the F-centers 9 reduces the coupling between the electromagnetic radiation and the F-centers 9 because the F-centers 9 move to regions in which the amplitude of the wavefunction of the electromagnetic radiation is less compared to the upper portion of the waveguide structure 512. Preferably, the coupling of the wavefunction of the electromagnetic radiation with the F-centers 9 is insignificant so that little or no absorption of the electromagnetic radiation occurs in the waveguiding structure 512 in the second switching state. In this case, the electromagnetic radiation passes through the waveguiding structure 512 without attenuation.

FIGS. 12A and 12B are vertical cross-sectional views of an eleventh exemplary electro-optical device according to an eleventh embodiment of the present invention. FIG. 12A is a vertical cross-sectional view of the eleventh exemplary electro-optical device in a first switching state, and FIG. 12B is a vertical cross-sectional view of the eleventh exemplary electro-optical device in a second switching state. The eleventh exemplary electro-optical device may be formed on a substrate including a substrate layer 504 and a second electrode 534. A waveguiding structure 512, which is an optical medium structure comprising an optical medium and configured to pass electromagnetic radiation, is formed on the second electrode 534. For example, the waveguiding structure 512 may be a rib waveguide having a central portion employed to transmit electromagnetic radiation and side portions having a lesser thickness than the central portion. A first electrode 524 is formed on the top surface and the sidewall surfaces of the waveguiding structure 512.

The waveguiding structure 512 is an optical medium structure and a doped transition metal oxide structure at the same time as in the tenth embodiment. Preferably, the waveguiding structure 512 has a higher refractive index than the materials of the second electrode 534 and the first electrode 524 to induce a total reflection condition at the surfaces of the waveguiding structure 512.

In the first switching state shown in FIG. 12A, the F-centers 9 are located in proximity to the first electrode 524 and away from the second electrode 534 because of a bias voltage across the first and second electrodes (524, 534). A doped substantially stoichiometric transition metal oxide region is formed beneath the top surface and the sidewall surfaces of the waveguiding structure 512 When the waveguiding structure 512 receives electromagnetic radiation, the wavefunction of the electromagnetic radiation overlaps with the F-centers 9 in the doped substantially stoichiometric transition metal oxide region, which comprises an oxygen deficient stoichiometric transition metal oxide material. The overlap of the wavefunction of the electromagnetic radiation with the F-centers 9 induces absorption of the electromagnetic radiation by the F-centers 9. Thus, the electromagnetic radiation may be completely absorbed or attenuated by the F-centers 9.

In the second switching state shown in FIG. 12B, the F-centers 9 are located in proximity to the second electrode 534 and away from the first electrode 524 because of a bias voltage across the first and second electrodes (524, 534). The doped substantially stoichiometric transition metal oxide region is repelled from beneath the top surface and the sidewall surfaces of the waveguiding structure 512, and moves to a bottom surface of the waveguiding structure 512. The movement of the F-centers 9 reduces the coupling between the electromagnetic radiation and the F-centers 9 because the F-centers 9 move to regions in which the amplitude of the wavefunction of the electromagnetic radiation is less compared to the region beneath the top surface and the sidewall surfaces of the waveguiding structure 512. Preferably, the coupling of the wavefunction of the electromagnetic radiation with the F-centers 9 is insignificant so that little or no absorption of the electromagnetic radiation occurs in the waveguiding structure 512 in the second switching state. In this case, the electromagnetic radiation passes through the waveguiding structure 512 without attenuation.

FIGS. 13A and 13B are vertical cross-sectional views of a twelfth exemplary electro-optical device according to a twelfth embodiment of the present invention. FIG. 13A is a vertical cross-sectional view of the twelfth exemplary electro-optical device in a first switching state, and FIG. 13B is a vertical cross-sectional view of the twelfth exemplary electro-optical device in a second switching state. The twelfth exemplary electro-optical device may be formed on a substrate including a first electrode 526 and a dielectric material layer 502. A waveguiding structure 512, which is an optical medium structure comprising an optical medium and configured to pass electromagnetic radiation, is formed on the dielectric material layer 502. For example, the waveguiding structure 512 may be a rib waveguide having a central portion employed to transmit electromagnetic radiation and side portions having a lesser thickness than the central portion. An upper transition meal oxide structure 518 is formed over the waveguiding structure 512. A second electrode 536 is formed on the top surface of the upper transition metal oxide structure 518.

The waveguiding structure 512 is an optical medium structure and a lower transition metal oxide structure at the same time. Each of the upper transition metal oxide structure 518 and the waveguiding structure 512 may comprise a transition metal oxide material of the present invention described above. The waveguiding structure 512 comprises a different material than the upper transition metal oxide structure 518 so that an optical interface may be formed between the waveguiding structure 512 and the upper transition metal oxide structure 518. Preferably, the waveguiding structure 512 has a higher refractive index than the materials of the upper transition metal oxide structure 518 and the dielectric material layer 502 to induce a total reflection condition at the surfaces of the waveguiding structure 512.

In the first switching state shown in FIG. 13A, the F-centers 9 are located in proximity to the first electrode 526 and away from the second electrode 536 due to a bias voltage across the first and second electrodes (526, 536). A doped substantially stoichiometric transition metal oxide region is formed within the waveguiding structure 512. F-centers 9 may move from the upper transition metal oxide structure 518 into the waveguiding structure 512. When the waveguiding structure 512 receives electromagnetic radiation, the wavefunction of the electromagnetic radiation overlaps with the F-centers 9 in the doped substantially stoichiometric transition metal oxide region, which comprises an oxygen deficient stoichiometric transition metal oxide material. The overlap of the wavefunction of the electromagnetic radiation with the F-centers 9 induces absorption of the electromagnetic radiation by the F-centers 9. Thus, the electromagnetic radiation may be completely absorbed or attenuated by the F-centers 9.

In the second switching state shown in FIG. 13B, the F-centers 9 are located in proximity to the second electrode 536 and away from the first electrode 526 because of a bias voltage across the first and second electrodes (526, 536). The doped substantially stoichiometric transition metal oxide region is repelled from the waveguiding structure 512, and moves into a portion of the upper transition metal oxide structure 518 directly underneath the second electrode 536. The movement of the F-centers 9 reduces the coupling between the electromagnetic radiation and the F-centers 9 because the F-centers 9 are now located outside the beam of the electromagnetic radiation, and any coupling between the wavefunction of the electromagnetic radiation and the F-centers 9 is through evanescent coupling, which decreases exponentially with distance from the waveguiding structure 512. Preferably, the distance between the waveguiding structure 512 and the oxygen deficiencies 8 is far enough so that the coupling of the wavefunction of the electromagnetic radiation with the F-centers 9 is insignificant. In this case, little or no absorption of the electromagnetic radiation occurs in the waveguiding structure 512 in the second switching state, and the electromagnetic radiation passes through the waveguiding structure 512 without attenuation.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. An electro-optical device comprising:
   an optical medium structure comprising an optical medium and configured to receive electromagnetic radiation;
   a doped transition metal oxide structure doped with at least one transition metal having at least two valence states and including a doped substantially stoichiometric transition metal oxide region including F-centers, wherein said doped transition metal oxide structure is of integral construction with said optical medium structure or abuts said optical medium structure; and
   a first electrode and a second electrode located on said doped transition metal oxide structure and configured to move oxygen vacancies by electrostatic force, wherein an overlap of a wavefunction of said electromagnetic radiation with said F-centers changes with a movement of location of said F-centers by said electrostatic force.

2. The electro-optical device of claim 1, wherein said doped transition metal oxide region is substantially free of F-centers, wherein said doped transition metal oxide structure further comprises a doped oxygen-deficient transition metal oxide region, and wherein said doped substantially stoichiometric transition metal oxide region is embedded in said doped oxygen-deficient transition metal oxide region.

3. The electro-optical device of claim 2, wherein said doped substantially stoichiometric transition metal oxide region has a greater absorption coefficient for said electromagnetic radiation than said doped oxygen-deficient transition metal oxide region.

4. The electro-optical device of claim 1, wherein said electro-optical device is configured to have a first switching state and a second switching state, wherein said F-centers are located in proximity to said first electrode and away from said second switching state in said first switching state, and wherein said F-centers are located in proximity to said second electrode and away from said first electrode in said second switching state.

5. The electro-optical device of claim 4, wherein said electro-optical device is configured to provide greater absorption of said electromagnetic radiation in said first switching state than in said second switching state.

6. The electro-optical device of claim 5, wherein said doped substantially stoichiometric transition metal oxide region is located in a path of said electromagnetic radiation in said first switching state, and wherein said doped substantially stoichiometric transition metal oxide region is located outside said path of said electromagnetic radiation in said second switching state.

7. The electro-optical device of claim 5, wherein said doped substantially stoichiometric transition metal oxide region is located outside a path of said electromagnetic radiation in said first and second switching states, and wherein said doped substantially stoichiometric transition metal oxide region is located in closer proximity to said electromagnetic radiation in said first switching state than in said second switching state.

8. The electro-optical device of claim 5, wherein said optical medium structure is a waveguiding structure, wherein said optical medium structure and said doped transition metal oxide structure comprise different materials, and wherein said optical medium structure abuts said doped transition metal oxide structure.

9. The electro-optical device of claim 5, wherein said optical medium structure is a waveguiding structure, wherein said optical medium structure and said doped transition metal oxide structure are of integral and unitary construction and comprise a same transition metal oxide material.

10. The electro-optical device of claim 9, wherein said doped substantially stoichiometric transition metal oxide region is located inside a path of said electromagnetic radiation in said first and second switching states, and wherein a doped substantially stoichiometric transition metal oxide region in said first switching state has a greater overlap with a wavefunction of said electromagnetic radiation than a doped substantially stoichiometric transition metal oxide region in said second switching state.

11. The electro-optical device of claim 5, wherein said optical medium structure is a waveguiding structure, wherein said doped transition metal oxide structure includes a cladding structure abutting said optical medium structure and said optical medium structure, wherein said doped substantially stoichiometric transition metal oxide region is located in said optical medium structure in said first switching state, and wherein said doped substantially stoichiometric transition metal oxide region is located in said cladding structure in said second switching state.

12. The electro-optical device of claim 1, further comprising a dielectric material layer abutting said optical medium structure and one of said first electrode and said second electrode, wherein said one of said first electrode and said second electrode does not abut said optical medium structure.

13. The electro-optical device of claim 1, further comprising a waveguiding structure configured to hold said electromagnetic radiation in resonance or to transmit said electromagnetic radiation from or to said optical medium structure.

14. The electro-optical device of claim 1, wherein said doped substantially stoichiometric transition metal oxide region comprises a doped metal oxide material including a dopant metal and a base metal oxide material, wherein said dopant metal is an elemental metal that has at least two different valence states in said base metal oxide material depending on oxygen content of said base metal oxide material, and wherein said base metal oxide material is selected from strontium titanium oxide $SrTiO_3$, calcium and/or strontium and/or barium titanium oxide $(Ca, Sr, Ba)TiO_3$, calcium and/or strontium and/or barium titanium oxide $(Ca, Sr, Ba)_2TiO_4$, strontium zirconium oxide $SrZrO_3$, other perovskites and perovskite-type oxides, nickel oxide NiO, titanium oxide $TiO_2$, other binary oxides, and electrically insulating high-mobility oxygen ion conductors.

15. The electro-optical device of claim 1, wherein said doped substantially stoichiometric transition metal oxide region has an absorption coefficient from about 0.1/cm to about 1,000,000/cm within a wavelength range for said electromagnetic radiation from about 350 nm to about 2,000 nm.

16. A method of forming an electro-optical device, said method comprising:
   forming an optical medium structure comprising an optical medium and configured to receive electromagnetic radiation on a substrate;
   forming a doped transition metal oxide structure doped with at least one transition metal having at least two valence states and including a doped substantially stoichiometric transition metal oxide region including F-centers on said substrate; and
   forming a first electrode and a second electrode configured to move oxygen vacancies by electrostatic force, wherein an overlap of a wavefunction of said electromagnetic radiation with said F-centers changes with a movement of location of said F-centers by said electrostatic force on said substrate.

17. A method of operating an electro-optical device, said method comprising:
   providing an electro-optical device comprising:
      an optical medium structure comprising an optical medium and configured to receive electromagnetic radiation;
      a doped transition metal oxide structure doped with at least one transition metal having at least two valence states and including a doped substantially stoichiometric transition metal oxide region including F-centers, wherein said doped transition metal oxide structure is of integral construction with said optical medium structure or abuts said optical medium structure; and
      a first electrode and a second electrode located on said doped transition metal oxide structure and configured to move location of said F-centers by electrostatic force; and
   applying a voltage bias across said first electrode and said second electrode, wherein said voltage bias generates an electrostatic field that applies said electrostatic force to, and moves, said location of said F-centers, and wherein an overlap of a wavefunction of said electromagnetic radiation with said F-centers changes with a movement of said location of said F-centers by said electrostatic field.

18. The method of claim 17, further comprising discontinuing application of said voltage bias across said first electrode and said second electrode after said movement of location of said F-centers by said electrostatic field, wherein said F-centers and a volume of said doped substantially stoichiometric transition metal oxide region remain stationary after application of said voltage bias is discontinued.

19. The method of claim 17, wherein said electro-optical device is configured to have a first switching state and a second switching state, wherein said F-centers are located in proximity to said first electrode and away from said second switching state in said first switching state, wherein said F-centers are located in proximity to said second electrode and away from said first electrode in said second switching state, and wherein said voltage bias changes a state of said electro-optical device from said first switching state to said second switching state or from said second switching state to said first switching state.

20. The method of claim 19, wherein said electromagnetic radiation has a first electromagnetic radiation component having a first spectral wavelength and a second electromagnetic radiation component having a second spectral wavelength, wherein said first electromagnetic radiation component and second electromagnetic radiation component pass through said optical medium in said second switching state, and wherein said first electromagnetic radiation component is absorbed in said optical medium and said second electromagnetic radiation component passes through said optical medium in said second switching state.

* * * * *